(12) United States Patent
Iqbal et al.

(10) Patent No.: US 10,199,621 B2
(45) Date of Patent: Feb. 5, 2019

(54) BATTERY CELL SPACER FOR ESTABLISHING DIELECTRIC BARRIERS WITHIN A BATTERY ASSEMBLY

(71) Applicant: FORD GLOBAL TECHNOLOGIES, LLC, Dearborn, MI (US)

(72) Inventors: Asif Iqbal, Macomb, MI (US); Daniel Miller, Dearborn, MI (US); Evan Mascianica, Ann Arbor, MI (US); Josef Dollison, Petersburg, MI (US); James Lawrence Swoish, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 342 days.

(21) Appl. No.: 14/736,336

(22) Filed: Jun. 11, 2015

(65) Prior Publication Data

US 2016/0365554 A1    Dec. 15, 2016

(51) Int. Cl.
| | |
|---|---|
| *H01M 2/14* | (2006.01) |
| *H01M 10/625* | (2014.01) |
| *H01M 10/04* | (2006.01) |
| *H01M 2/10* | (2006.01) |
| *H01M 10/647* | (2014.01) |
| *H01M 10/6555* | (2014.01) |
| *H01M 10/6554* | (2014.01) |

(52) U.S. Cl.
CPC ........... *H01M 2/14* (2013.01); *H01M 2/1077* (2013.01); *H01M 10/04* (2013.01); *H01M 10/625* (2015.04); *H01M 10/647* (2015.04); *H01M 10/6555* (2015.04); *H01M 10/6554* (2015.04); *H01M 2220/20* (2013.01)

(58) Field of Classification Search
CPC .... H01M 2/14; H01M 10/6554; H01M 10/04; H01M 10/625; H01M 2220/20
See application file for complete search history.

(56) References Cited

U.S. PATENT DOCUMENTS

| | | | |
|---|---|---|---|
| 8,071,234 B2 | 12/2011 | Okada et al. | |
| 8,124,262 B2 | 2/2012 | Okada et al. | |
| 8,268,474 B2 | 9/2012 | Kim et al. | |
| 9,203,065 B2* | 12/2015 | Kim | H01M 2/1077 |
| 9,887,440 B2* | 2/2018 | Kubota | H01M 10/6556 |
| 2007/0037051 A1 | 2/2007 | Kim et al. | |
| 2008/0160395 A1* | 7/2008 | Okada | B60L 3/0046 |
| | | | 429/99 |
| 2012/0177952 A1 | 7/2012 | Maguire et al. | |
| 2013/0260197 A1 | 10/2013 | Okada et al. | |
| 2016/0149180 A1* | 5/2016 | Tokoo | H01M 2/1077 |
| | | | 429/120 |

FOREIGN PATENT DOCUMENTS

WO    WO2014203694    * 12/2014

* cited by examiner

*Primary Examiner* — Ula C Ruddock
*Assistant Examiner* — Thomas H. Parsons
(74) *Attorney, Agent, or Firm* — Carlson, Gaskey & Olds

(57) ABSTRACT

A battery cell spacer according to an exemplary aspect of the present disclosure includes, among other things, a body extending between a top surface and a bottom surface and a saddle disposed at the top surface of the body and configured to establish a barrier surface between metallic components.

26 Claims, 6 Drawing Sheets

BATTERY CELL SPACER FOR ESTABLISHING DIELECTRIC BARRIERS WITHIN A BATTERY ASSEMBLY

TECHNICAL FIELD

This disclosure relates to a battery assembly for an electrified vehicle. The battery assembly includes a battery cell spacer that establishes a dielectric barrier between adjacent battery cells and between other components of a battery assembly.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering the electric machines of an electrified vehicle typically includes multiple battery arrays or assemblies. Each battery array includes a plurality of battery cells and a plurality of spacers arranged between adjacent battery cells. The battery cells and spacers are often stacked side-by-side in an alternating fashion to physically separate the adjacent battery cells from one another. The spacers establish dielectric barriers between the adjacent battery cells to reduce the likelihood of a short circuit across the battery cells.

SUMMARY

A battery cell spacer according to an exemplary aspect of the present disclosure includes, among other things, a body extending between a top surface and a bottom surface and a saddle disposed at the top surface of the body and configured to establish a barrier surface between metallic components.

In a further non-limiting embodiment of the foregoing battery cell spacer, the body includes opposing faces that horizontally extend between a first side wall and a second side wall.

In a further non-limiting embodiment of either of the foregoing battery cell spacers, the saddle includes at least one leg that protrudes laterally away from the body.

In a further non-limiting embodiment of any of the foregoing battery cell spacers, the saddle includes sidewalls that protrude upwardly from the top surface of the body.

In a further non-limiting embodiment of any of the foregoing battery cell spacers, the saddle includes legs that extend laterally away from opposing faces of the body and sidewalls that protrude upwardly from the top surface, the legs and the sidewalls establishing a platform for receiving one of the metallic components.

In a further non-limiting embodiment of any of the foregoing battery cell spacers, the body extends between a first side wall and a second side wall, and each of the first side wall and the second side wall include a flange at a top surface of the first side wall and the second side wall.

In a further non-limiting embodiment of any of the foregoing battery cell spacers, the flange of the first side wall extends above the top surface of the body and toward the second side wall.

In a further non-limiting embodiment of any of the foregoing battery cell spacers, the saddle includes legs that extend over top of at least one battery cell received against a face of the body.

In a further non-limiting embodiment of any of the foregoing battery cell spacers, the body is made of a thermally conductive material.

In a further non-limiting embodiment of any of the foregoing battery cell spacers, the body and the saddle are a single piece, unitary part having a monolithic structure.

In a further non-limiting embodiment of any of the foregoing battery cell spacers, the body extends between a first side wall and a second side wall, the first side wall and the second side wall including a flange having a stepped surface.

In a further non-limiting embodiment of any of the foregoing battery cell spacers, the saddle includes a first leg extending in a first plane and a second leg extending in a second plane that is vertically offset from the first plane.

A battery assembly according to another exemplary aspect of the present disclosure includes, among other things, a first battery cell, a second battery cell, a spacer positioned between the first battery cell and the second battery cell and a center bar extending above a top surface of each of the first battery cell and the second battery cell. The center bar is received at a top surface of the spacer such that the center bar is spaced from the top surfaces of the first battery cell and the second battery cell.

In a further non-limiting embodiment of the foregoing battery assembly, the center bar is received on a platform of a saddle of the spacer.

In a further non-limiting embodiment of either of the foregoing battery assemblies, the platform is established by legs and sidewalls of the saddle.

In a further non-limiting embodiment of any of the foregoing battery assemblies, the platform establishes a dielectric barrier between the center bar and the top surfaces of the first battery cell and the second battery cell.

In a further non-limiting embodiment of any of the foregoing battery assemblies, the spacer includes opposing faces that establish a dielectric barrier between the first battery cell and the second battery cell.

In a further non-limiting embodiment of any of the foregoing battery assemblies, the spacer includes a first side wall and a second side wall, each of the first side wall and the second side wall including a flange that establishes a dielectric barrier between the top surfaces of the first battery cell and the second battery cell and a portion of a support structure that surrounds the first battery cell and the second battery cell.

In a further non-limiting embodiment of any of the foregoing battery assemblies, the first battery cell, the second battery cell and the spacer are positioned atop a heat exchanger plate.

A method according to another exemplary aspect of the present disclosure includes, among other things, positioning a spacer between a first battery cell and a second battery cell and positioning a center bar across a top surface of each of the first battery cell and the second battery cell. The spacer establishes a first dielectric barrier between the first battery cell and the second battery cell and a second dielectric barrier between the center bar and the top surfaces.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may include one or more battery cell spacers positioned between adjacent battery cells of the battery assembly. The battery cell spacers establish a first dielectric barrier between adjacent battery cells. The battery cell spacers also establish a second dielectric barrier between a center bar of the battery assembly and top surfaces of the battery cells. In some embodiments, the battery cell spacers may nest with one another to form a grouping of battery cells spacers. These and other features are discussed in greater detail in the following paragraphs of this detailed description.

Figure 1:
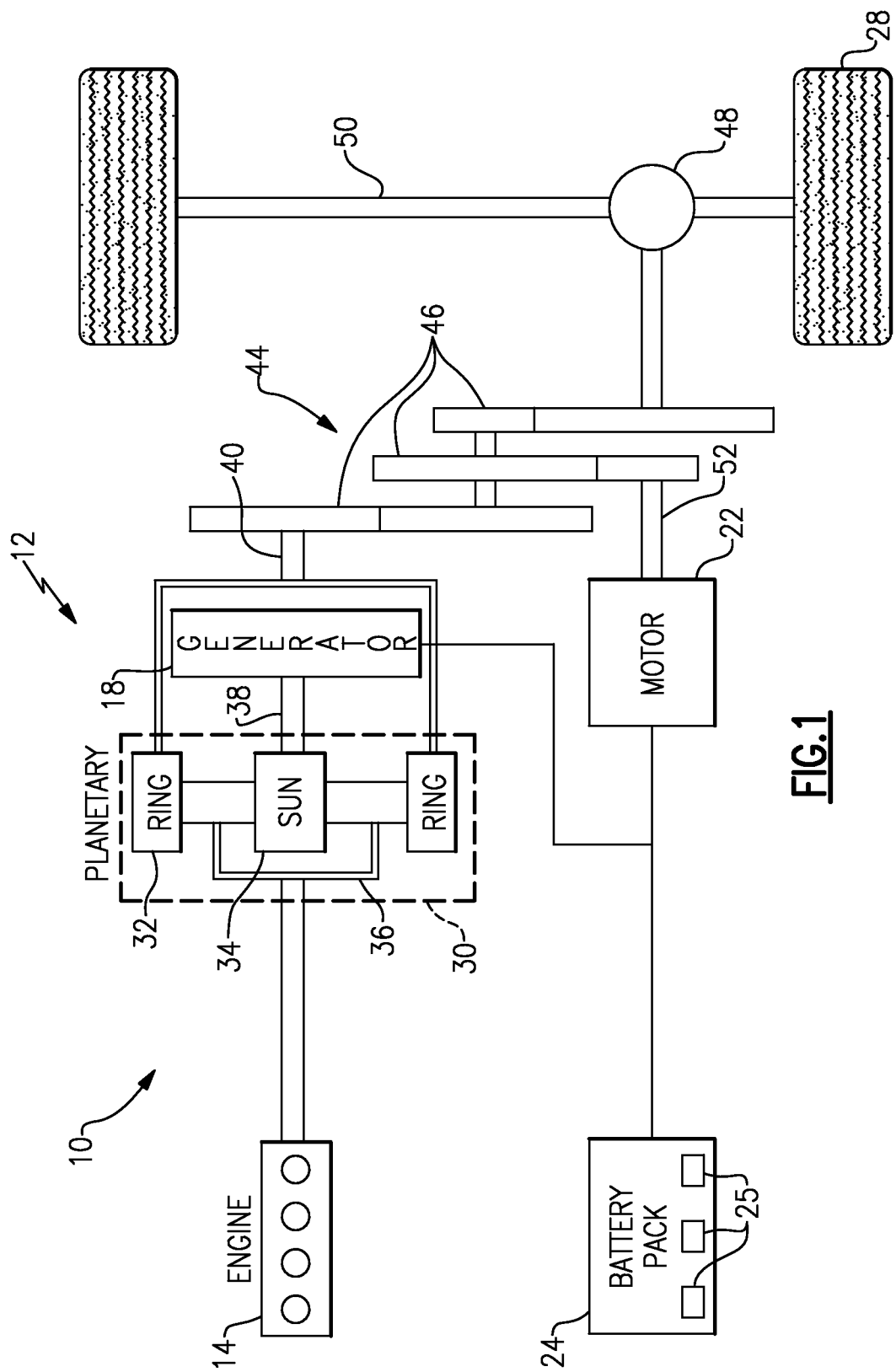
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
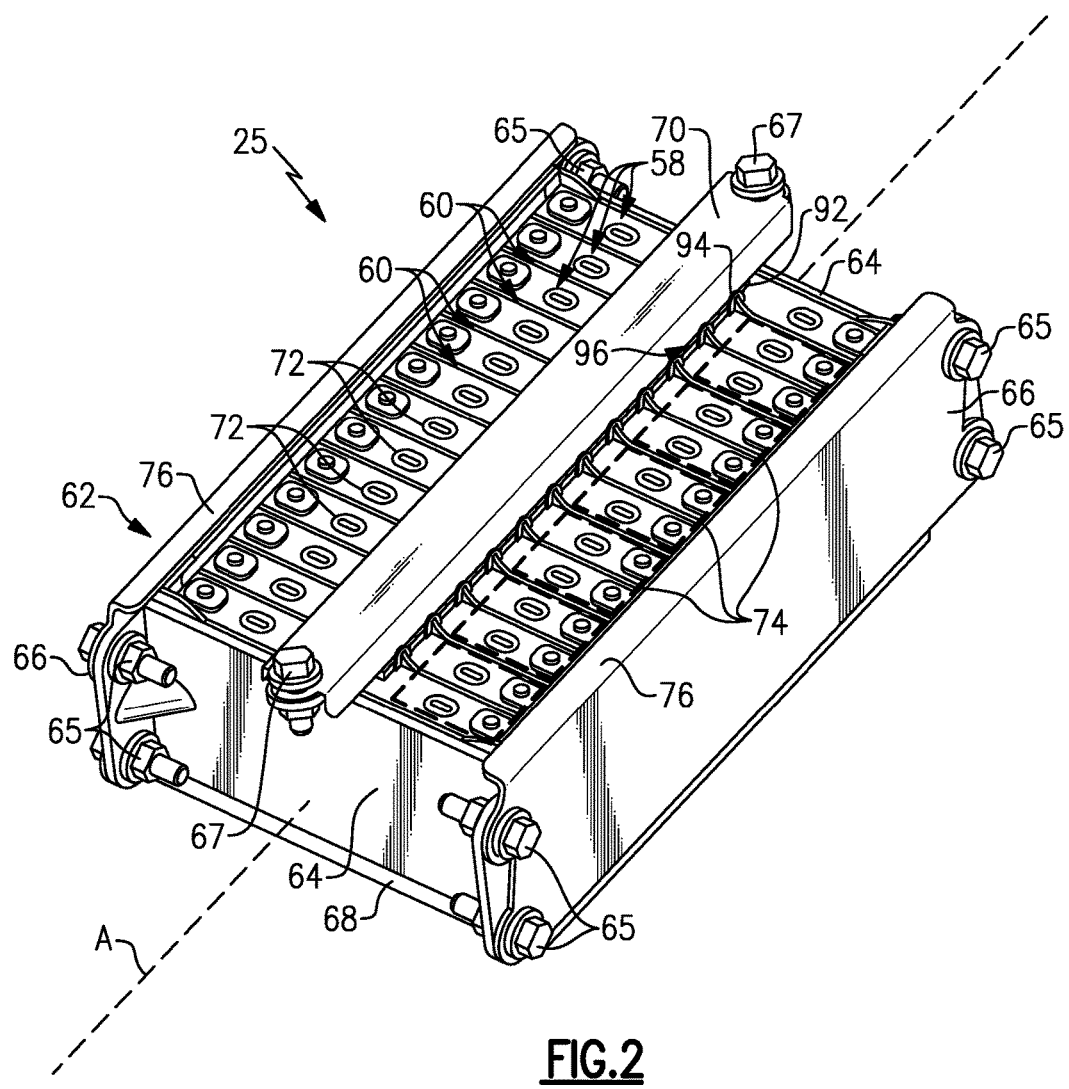
FIG. 2 illustrates a battery assembly of an electrified vehicle.

FIG. 2 illustrates a battery assembly 25 that can be employed within an electrified vehicle. For example, the battery assembly 25 could be part of the battery pack 24 of the electrified vehicle 12 of FIG. 1. The battery assembly 25 includes a plurality of battery cells 58 for supplying electrical power to various electrical loads of the electrified vehicle 12. Although a specific number of battery cells 58 are depicted in FIG. 2, the battery assembly 25 could include a fewer or a greater number of battery cells within the scope of this disclosure. In other words, this disclosure is not limited to the specific configuration shown in FIG. 2.

The battery cells 58 may be stacked side-by-side along a longitudinal axis A to construct a grouping of battery cells 58, sometimes referred to as a "cell stack." In one non-limiting embodiment, the battery cells 58 are prismatic, lithium-ion cells. However, battery cells having other geometries (cylindrical, pouch, etc.), other chemistries (nickel-metal hydride, lead-acid, etc.) or both could alternatively be utilized within the scope of this disclosure.

Battery cell spacers 60 may be positioned between adjacent battery cells 58 of the cell stack of the battery assembly 25. For example, a plurality of battery cells 58 and a plurality of battery cell spacers 60 may be arranged side-by-side in an alternating fashion to construct the battery assembly 25. The battery cell spacers 60 may also be referred to as separators or dividers. The battery assembly 25 could include any number of battery cells 58 and battery cell spacers 60 within the scope of this disclosure. In one non-limiting embodiment, the battery cell spacers 60 are single-piece, unitary parts having a monolithic structure.

Each battery cell spacer 60 can accommodate two adjacent battery cells 58. The battery cells spacers 60 are disposed within the battery assembly 25 along the longitudinal axis A such that they are contiguous with the battery cells 58.

The battery cell spacers 60 may be made of a thermally conductive and electrically insulating material. In one non-limiting embodiment, the battery cell spacers 60 are made of high density polyethylene (HDPE). In another non-limiting embodiment, the battery cell spacers 60 are made of polypropylene (PP). Other thermally conductive and electrically insulating materials or combinations of materials could alternatively be utilized to construct the battery cell spacers 60.

Various support structures may be utilized to assemble the battery assembly 25, which can then be mounted inside a battery pack, such as the battery pack 24 of the electrified vehicle 12 of FIG. 1, for example. In one non-limiting embodiment, a support structure 62 generally surrounds the stacked battery cells 58 and battery cell spacers 60. The support structure 62 may include opposing end walls 64 disposed at the longitudinal extents of the grouping of battery cells 58 and battery cell spacers 60 and opposing side walls 66 that extend on opposite sides of the battery assembly 25 and connect between the opposing end walls 64. The end walls 64 and the side walls 66 cooperate to hold the battery cells 58 under compression relative to one another. The side walls 66 may be connected to the end walls 64 in any known manner. In one non-limiting embodiment, the side walls 66 are connected to the end walls 64 by a plurality of fasteners 65.

In another non-limiting embodiment, the support structure 62 includes a bottom plate 68. The bottom plate 68 may be configured as a heat exchanger plate for removing heat generated by the battery cells 58 during charging and discharging operations.

A center bar 70 may extend above top surfaces 72 of the battery cells 58. In one non-limiting embodiment, the center bar 70 is secured to the opposing end walls 64, such as with fasteners 67, to provide rigidity to the battery assembly 25.

In another non-limiting embodiment, the center bar 70 biases the battery cells 58 toward the bottom plate 68. The center bar 70 may be a metallic structure that is spaced from the top surfaces 72 of the battery cells 58 by a portion of the battery cell spacers 60.

Bus bars 74 may be attached, such as by welding, to one or more terminals of the battery cells 58 so that electrical energy communicates to and from the battery cells 58 through the bar bars 74. A highly schematic depiction of several bus bars 74 is shown using phantom lines in FIG. 2.

The battery cell spacers 60 establish multiple dielectric barriers within the battery assembly 25. For example, in one non-limiting embodiment, the battery cell spacers 60 establish a first dielectric barrier between adjacent battery cells 58 of the battery assembly 25. The battery cells 58 are made of metallic materials and therefore it is necessary to isolate the battery cells 58 from one another to avoid short circuits. The insulating material of each battery cell spacer 60 electrically isolates neighboring battery cells 58 from one another.

In another non-limiting embodiment, the battery cell spacers 60 establish a second dielectric barrier between the top surfaces 72 of the battery cells 58 and the center bar 70. In yet another non-limiting embodiment, the battery cell spacers 60 establish a third dielectric barrier between the top surfaces 72 of the battery cells 58 and flanges 76 of the side walls 66 of the support structure 62. The flanges 76 may be made of a metallic material and may be bent portions of the side walls 66 that extend directly above the top surfaces 72 of the battery cells 58. The flanges 76 may be bent to extend in a direction toward the opposite side wall 66.

Figure 3:
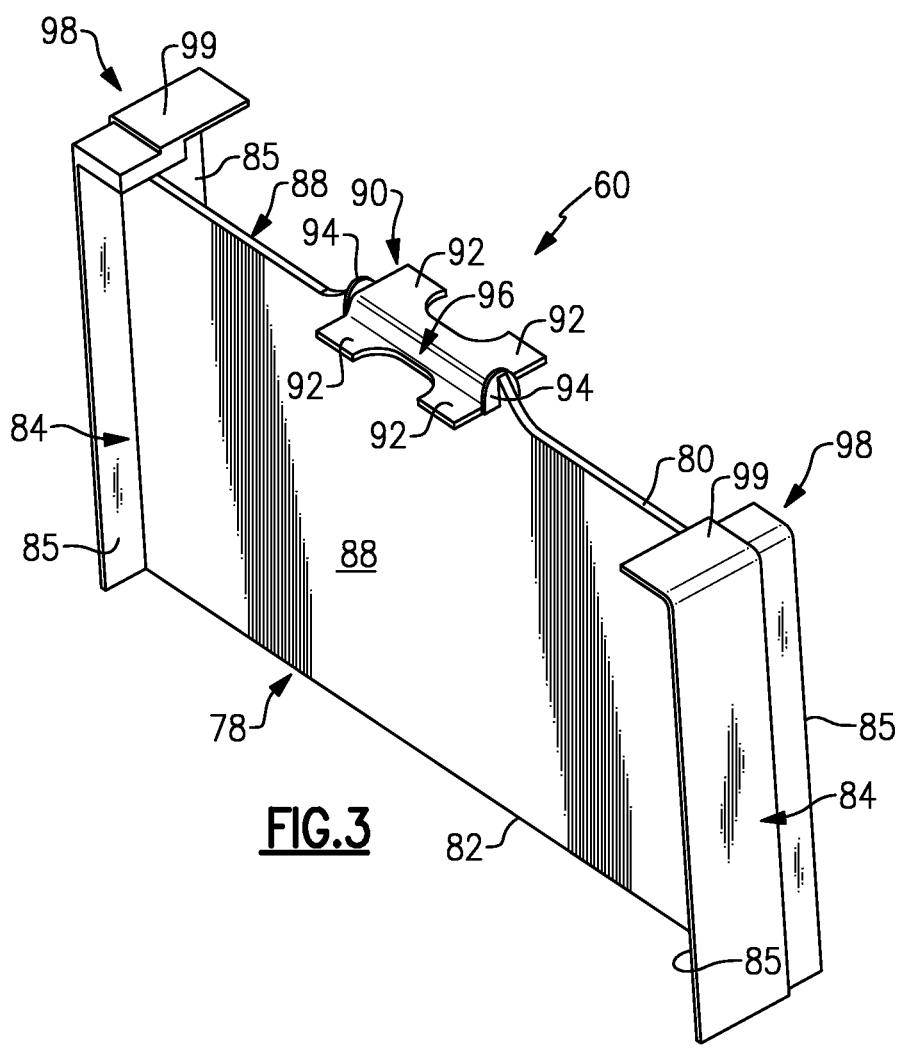
FIG. 3 illustrates a battery cell spacer for use within a battery assembly.

FIG. 3, with continued reference to FIG. 2, illustrates an exemplary battery cell spacer 60. The battery cell spacer 60 may include a body 78 that vertically extends between a top surface 80 and a bottom surface 82. The body 78 additionally includes opposing faces 88 that horizontally extend between a first side wall 84 and a second side wall 86. Each opposing face 88 is received against a battery cell 58 once disposed within the battery assembly 25.

The battery cell spacer 60 may include multiple features designed to establish one or more dielectric barriers throughout the battery assembly 25. For example, the opposing faces 88 of the battery cell spacer 60 establish a dielectric barrier between adjacent battery cells 58 of the battery assembly 25.

In another non-limiting embodiment, the battery cell spacer 60 includes a saddle 90 disposed at the top surface 80 of the body 78. As depicted, the saddle 90 may be positioned near a center of the top surface 80, although other locations are also contemplated. The saddle 90 may include one or more legs 92 that protrude laterally in a direction away from each of the opposing faces 88 of the body 78 (i.e., in a direction toward an adjacent battery cell 58 or battery cell spacer 60). The saddle 90 may additionally include sidewalls 94 that protrude upwardly from the top surface 80 of the body 78. Together, the legs 92 and the sidewalls 94 establish a platform 96 for receiving the center bar 70 (see FIG. 2). The center bar 70 is spaced from the top surfaces 72 of the battery cells 58 by the platform 96. Accordingly, the platform 96 establishes a dielectric barrier between the top surfaces 72 of the battery cells 58 and the center bar 70.

Each of the first side wall 84 and the second side wall 86 include walls 85 that may extend outwardly of the opposing faces 88 of the body 78 of the battery cell spacer 60. A flange 98 is provided at a top surface 99 of each the first side wall 84 and the second side wall 86. The flanges 98 may establish yet another dielectric barrier between the tops surfaces 72 of the battery cells and the flanges 76 of the side walls 66 of the battery assembly 25 (see FIG. 2).

Figure 4A:
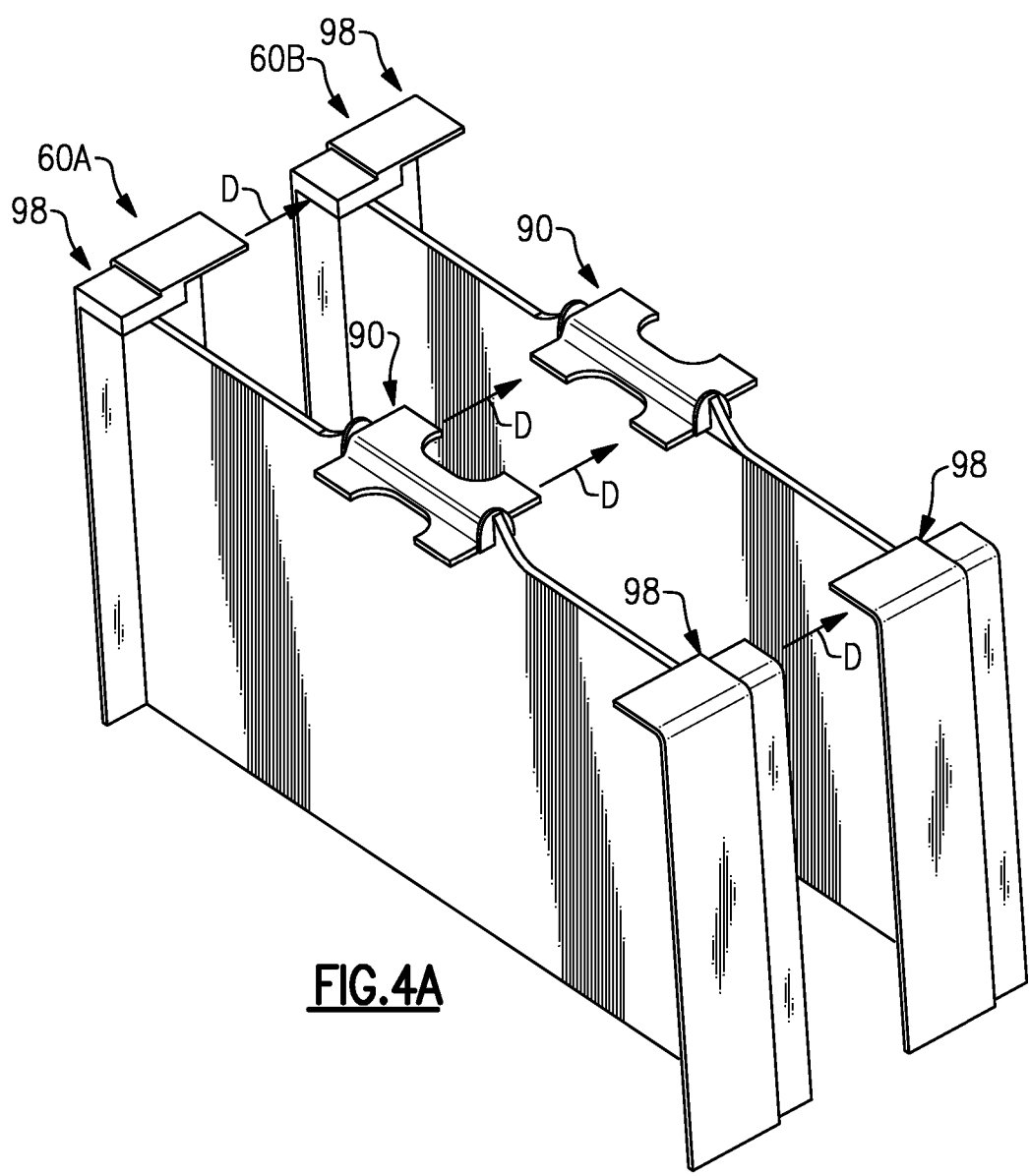
FIGS. 4A and 4B illustrate groupings of shingled battery cell spacers.

FIGS. 4A, 4B, 4C and 4D illustrate groupings of battery cell spacers 60. The battery cell spacers 60 may nest with one another in an overlapping, shingled configuration. Two battery cell spacers 60 are depicted in FIG. 4A, which omits the battery cells 58 for clarity, and a plurality of battery cell spacers 60 are depicted in each of FIGS. 4B, 4C and 4D. This disclosure is not limited to any specific number of battery cell spacers 60 or battery cells 58 and is not intended to be limited to the specific configurations shown by these Figures.

Referring first to FIG. 4A, the battery cell spacers 60A, 60B may be nested relative to one another by moving the battery cell spacer 60A in a direction of arrows D toward the adjacent battery cell spacer 60B. As discussed in greater detail below, the flanges 98 and saddles 90 of the battery cell spacers 60A, 60B overlap one another in the nested configuration.

Figure 4B:
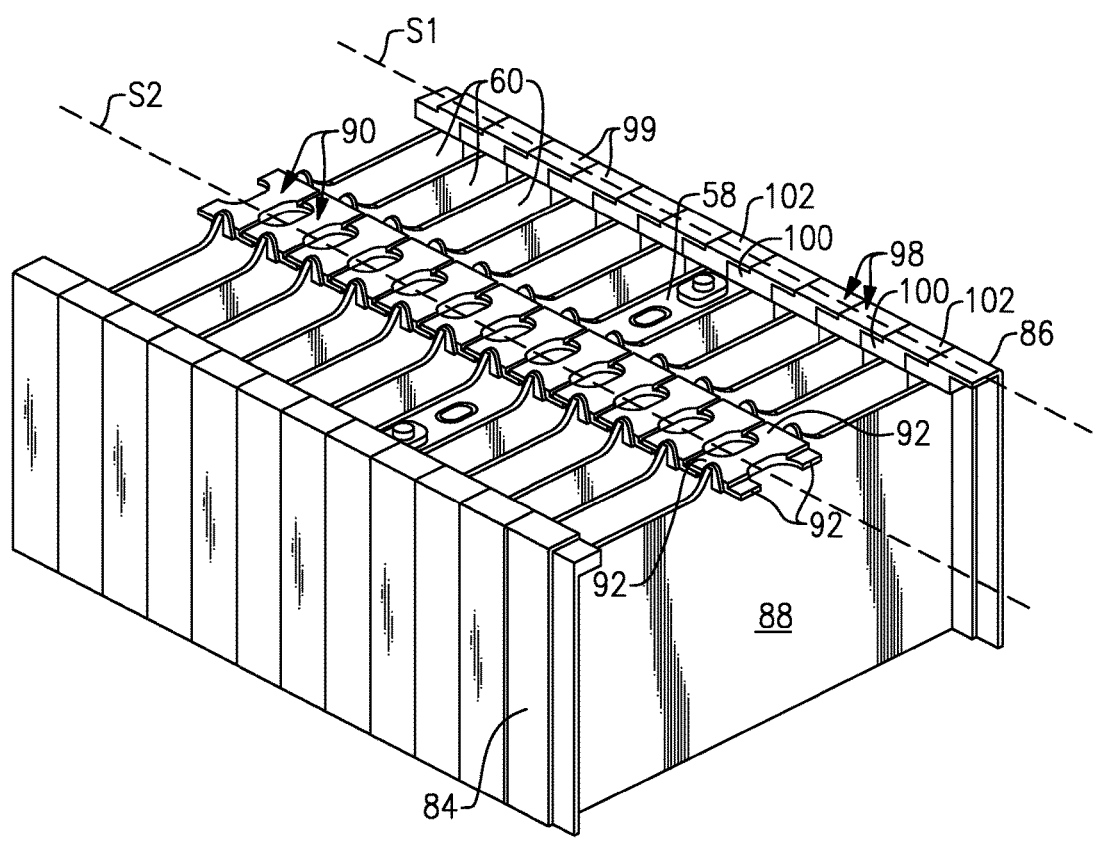
Figure 4C:
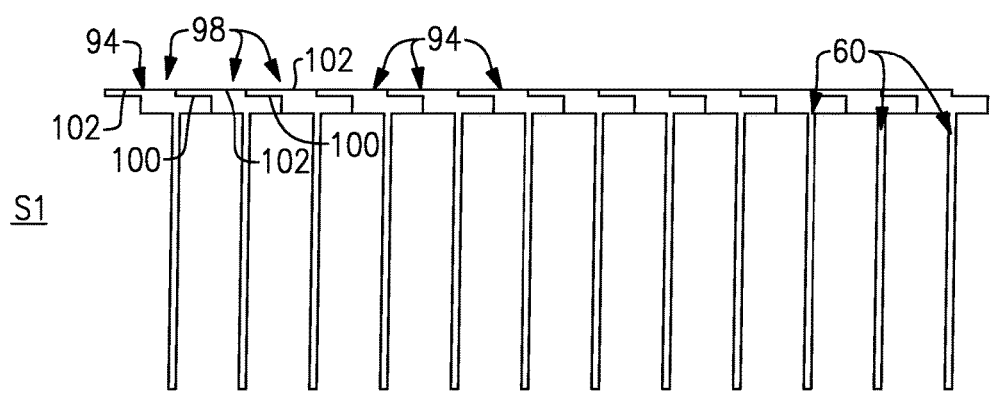
FIG. 4C is a cross-sectional view through section S1 of the grouping of battery cell spacers of FIG. 4B.
Figure 4D:
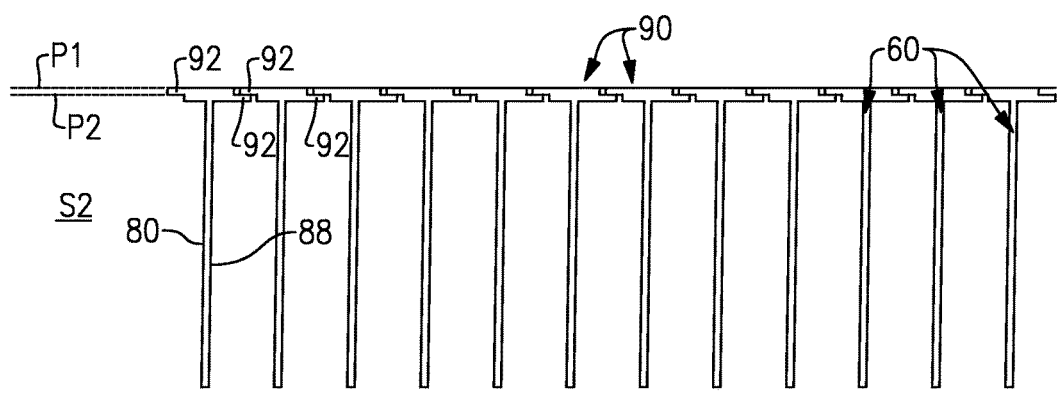
FIG. 4D is a cross-sectional view through section S2 of the grouping of battery cell spacers of FIG. 4B.

Referring now to FIGS. 4B, 4C and 4D, the battery cell spacers 60 may nest with one another at the flanges 98 of the first side wall 84 and the second side wall 86 (see section S1 of FIGS. 4B and 4C). The top surfaces 99 of the flanges 98 may be stepped surfaces that include a lower surface 100 and an upper surface 102. The lower surfaces 100 of each battery cell spacer 60 nest with the upper surfaces 102 of an adjacent battery cell spacer 60. In one non-limiting embodiment, the lower surface 100 of the flange 98 of the first side wall 84 is positioned on an opposite side of the battery cell spacer 60 from the lower surface of the flange 98 of the second side wall 86. The same relationship may exist for the upper surfaces 102.

The battery cell spacers 60 may also nest with one another at the saddles 90 (see section S2 of FIGS. 4B and 4D). In one non-limiting embodiment, the legs 92 that extend laterally away from the opposing faces 88 extend in different planes. For example, the legs 92 that extend away from a first of the opposing faces 88 extend in a first plane P1 and the legs 92 that extend from the second of the opposing faces 88 extend in a second plane P2 (best shown in FIG. 4D). The second plane P2 is vertically offset from the first plane P1. Therefore, legs 92 extending in the first plane P1 can nest with legs 92 of an adjacent battery cell spacer 60 that extend in the second plane P2 by virtue of the height differences between these laterally extending legs 92.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery cell spacer, comprising:
 a body extending between a top surface and a bottom surface and including opposing faces that horizontally extend between a first side wall and a second side wall, wherein each of said opposing faces is a solid face that excludes any cut-outs or openings; and
 a saddle disposed at said top surface of said body and configured to establish a second barrier surface between metallic components.

2. The battery cell spacer as recited in claim 1, wherein said saddle includes at least one leg that protrudes laterally away from said body.

3. The battery cell spacer as recited in claim 1, wherein said saddle includes sidewalls that protrude upwardly from said top surface of said body.

4. The battery cell spacer as recited in claim 1, wherein said saddle includes legs that extend laterally away from opposing faces of said body and sidewalls that protrude upwardly from said top surface, said legs and said sidewalls establishing a platform for receiving one of said metallic components.

5. The battery cell spacer as recited in claim 1, wherein each of said first side wall and said second side wall include a flange at a top surface of said first side wall and said second side wall.

6. The battery cell spacer as recited in claim 5, wherein said flange of said first side wall extends above said top surface of said body and toward said second side wall.

7. The battery cell spacer as recited in claim 1, wherein said saddle includes legs that extend over top of at least one battery cell received against a face of said body.

8. The battery cell spacer as recited in claim 1, wherein said body is made of a thermally conductive material.

9. The battery cell spacer as recited in claim 1, wherein said body and said saddle are a single piece, unitary part having a monolithic structure.

10. The battery cell spacer as recited in claim 1, wherein said first side wall and said second side wall including a flange having a stepped surface.

11. The battery cell spacer in claim 1, wherein said saddle includes a first leg extending in a first plane and a second leg extending in a second plane that is vertically offset from said first plane.

12. The battery cell spacer as recited in claim 1, wherein said first side wall and said second side wall each exclude any cut-outs or openings.

13. The battery cell spacer as recited in claim 1, wherein said solid face is a completely planar surface.

14. A battery assembly, comprising:
 a first battery cell;
 a second battery cell;
 a first spacer positioned between said first battery cell and said second battery cell;
 a center bar extending above a top surface of each of said first battery cell and said second battery cell, said center bar received at a platform of a saddle that is elevated above a top surface of said first spacer such that said center bar is spaced from said top surfaces of said first battery cell and said second battery cell; and
 a second spacer that overlaps at least a portion of said first spacer.

15. The battery assembly as recited in claim 14, wherein said platform is established by legs and sidewalls of said saddle.

16. The battery assembly as recited in claim 14, wherein said platform establishes a dielectric barrier between said center bar and said top surfaces of said first battery cell and said second battery cell.

17. The battery assembly as recited in claim 14, wherein said first spacer includes opposing faces that establish a dielectric barrier between said first battery cell and said second battery cell.

18. The battery assembly as recited in claim 17, wherein said opposing faces are solid faces that exclude any cut-outs or other openings.

19. The battery assembly as recited in claim 14, wherein said first spacer includes a first side wall and a second side wall, each of said first side wall and said second side wall including a flange that establishes a dielectric barrier between said top surfaces of said first battery cell and said second battery cell and a portion of a support structure that surrounds said first battery cell and said second battery cell.

20. The battery assembly as recited in claim 14, wherein said first battery cell, said second battery cell and said first spacer are positioned atop a heat exchanger plate.

21. The battery assembly as recited in claim 14, wherein a second side wall flange of said second spacer overlaps a first side wall flange of said first spacer.

22. The battery assembly as recited in claim 14, wherein a second saddle leg of said second spacer overlaps a first saddle leg of said first spacer.

23. The battery assembly as recited in claim 14, comprising a support structure that surrounds said first battery cell and said second battery cell, wherein said support structure includes opposing end walls, opposing side walls, and a plurality of fasteners that connect the opposing side walls to the opposing end walls.

24. A battery assembly, comprising:
   a first spacer including a first flange at a first side wall and a first saddle at a first top surface;
   a second spacer including a second flange at a second side wall and a second saddle at a second top surface, and said second flange overlaps said first flange or said second saddle overlaps said first saddle; and
   a center bar received over said first saddle and said second saddle,
   wherein said first saddle is elevated relative to said first top surface and said second saddle is elevated relative to said second top surface.

25. The battery assembly as recited in claim 24, wherein a transition between said first saddle and said first top surface is curved.

26. The battery assembly as recited in claim 25, wherein said transition connects to an upwardly protruding sidewall of said first saddle.

* * * * *